United States Patent [19]

Schaulin et al.

[11] Patent Number: 5,176,717
[45] Date of Patent: Jan. 5, 1993

[54] USE OF SULFONATED POLYAZO DYES FOR DYEING LEATHER IN BRILLIANT FAST RED SHADES

[75] Inventors: Rudolf Schaulin, Riehen; Peter Moser, Binningen; Alois Püntener, Rheinfelden, all of Switzerland

[73] Assignee: Ciba-Geigy Corporation, Ardsley, N.Y.

[21] Appl. No.: 732,987

[22] Filed: Jul. 19, 1991

[30] Foreign Application Priority Data

Jul. 24, 1990 [CH] Switzerland .................. 2454/90

[51] Int. Cl.⁵ .................. C09B 33/05; C09B 43/16; C09B 62/09; D06P 3/32
[52] U.S. Cl. .................. 8/437; 8/436; 8/549; 8/681; 8/687; 8/688
[58] Field of Search .................. 8/437, 681, 687

[56] References Cited

U.S. PATENT DOCUMENTS

| | | | |
|---|---|---|---|
| 4,338,092 | 7/1982 | Schneider | 8/549 |
| 4,742,160 | 5/1988 | Dore et al. | 534/605 |
| 4,816,034 | 3/1989 | Bhatt et al. | 8/641 |
| 4,866,163 | 9/1989 | Koch | 534/634 |
| 5,006,128 | 4/1991 | Pedrazzi | 8/437 |
| 5,007,941 | 4/1991 | Martinelli et al. | 8/436 |
| 5,032,142 | 7/1991 | Egger et al. | 8/549 |

FOREIGN PATENT DOCUMENTS

| | | |
|---|---|---|
| 56-011957 | 2/1981 | Japan . |
| 61-101576 | 5/1986 | Japan . |
| 62-132966 | 6/1987 | Japan . |
| 62-250060 | 10/1987 | Japan . |
| 2007250 | 5/1979 | United Kingdom . |

OTHER PUBLICATIONS

Chemical Abstracts, 62, 10563e (1964).
Chemical Abstracts, 95, 63664b (1981).
Chemical Abstracts 105 174598c (1986).
Chemical Abstracts 108:114199 (1988).
Chemical Abstracts 111:235001 (1989).

*Primary Examiner*—A. Lionel Clingman
*Attorney, Agent, or Firm*—Marla J. Mathias; Edward McC. Roberts

[57] ABSTRACT

The use of compounds of the formula

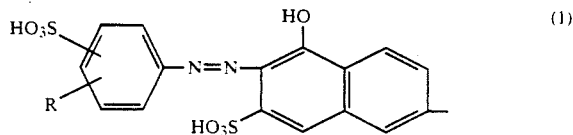

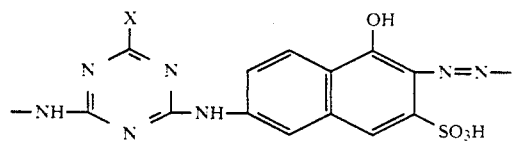

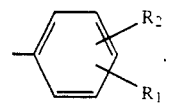

in which the symbols are as defined in claim 1, for dyeing leather is described.

16 Claims, No Drawings

USE OF SULFONATED POLYAZO DYES FOR DYEING LEATHER IN BRILLIANT FAST RED SHADES

The present invention relates to the use of specific polyazo dyes for dyeing leather.

The present invention therefore relates to the use of compounds of the formula

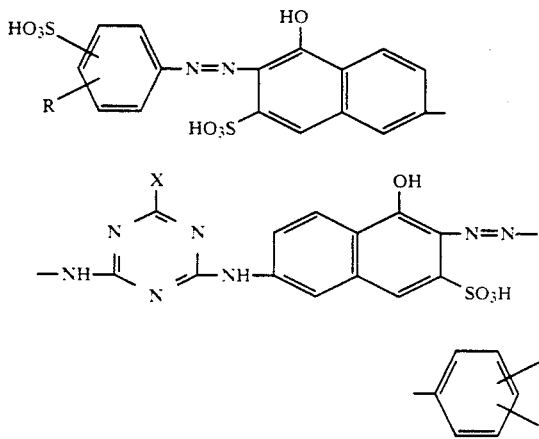

in which R and $R_1$ independently of one another are hydrogen, $C_1$–$C_4$alkyl, $C_1$–$C_4$alkoxy, unsubstituted or substituted $C_2$–$C_4$alkanoylamino or substituted or unsubstituted benzoylamino, $R_2$ is hydrogen or sulfo and X is hydroxy, $C_1$–$C_4$alkoxy, $C_1$–$C_4$alkylthio, amino, N-mono-or N,N-di-$C_1$–$C_4$alkylamino which is unsubstituted or substituted in the alkyl moiety by hydroxy, sulfo, carboxy or by $C_1$–$C_4$ alkoxy, or is cyclohexylamino, morpholino, 3-carboxy- or 3-carbamoyl-pyridin-1-yl, halogen or substituted or unsubstituted phenylamino or N-$C_1$–$C_4$alkyl-N-phenylamino, for the dyeing of leather.

If R, $R_1$ or one of the variables mentioned below is $C_1$–$C_4$alkyl, this is to be understood as methyl, ethyl, n- or iso-propyl or n-, iso-, sec- or tert-butyl, preferably methyl or ethyl and especially preferably methyl.

If R, $R_1$ or one of the variables mentioned below is $C_1$–$C_4$alkoxy, this is generally methoxy, ethoxy, n- or iso-propoxy or n-, iso-, sec- or tert-butoxy.

$C_1$–$C_4$Alkoxy R and $R_1$ preferably are, each independently of one another, methoxy or ethoxy and especially preferably methoxy.

Unsubstituted or substituted $C_2$–$C_4$alkanoylamino R and/or $R_1$ are, for example, unsubstituted or, for example, hydroxy-substituted acetylamino, propionylamino or n- or iso-butyrylamino, preferably acetylamino, hydroxyacetylamino or propionylamino and especially preferably acetylamino.

Substituted or unsubstituted benzoylamino R and/or $R_1$ can, for example, be benzoylamino which is unsubstituted or substituted by methyl, methoxy, chlorine, sulfamoyl and/or sulfo, and preferably unsubstituted benzoylamino.

R and $R_1$ independently of one another are preferably each hydrogen, methyl, ethyl, methoxy, ethoxy, acetylamino, hydroxyacetylamino, propionylamino or benzoylamino and especially preferably each methyl, methoxy, ethoxy, acetylamino, propionylamino or benzoylamino. The radicals R and $R_1$ can be different or preferably identical.

Especially preferably, R and $R_1$ are each acetylamino or methoxy and especially preferably each methoxy.

$R_2$ is preferably sulfo.

Halogen X is, for example, fluorine, bromine and especially chlorine.

A phenylamino or N-$C_1$–$C_4$alkyl-N-phenylamino radical X can be, for example, a phenylamino or N-$C_1$–$C_4$alkyl-N-phenylamino radical which is unsubstituted or substituted in the phenyl moiety by, for example, $C_1$–$C_4$alkyl, $C_1$–$C_4$alkoxy, carboxy, sulfo, sulfamoyl, N-mono- or N,N-di-$C_1$–$C_4$alkylsulfamoyl and/or halogen.

Examples of suitable phenylamino radicals X are phenylamino, o-, m- or p-methylphenylamino, o-, m- or p-methoxyphenylamino, o-, m- or p-chlorophenylamino, 3,4-dichlorophenylamino, o-, m- or p-sulfophenylamino or phenylamino which is substituted in the o-, m- or p-position by sulfamoyl, N-methylsulfamoyl, N-ethylsulfamoyl, N,N-dimethylsulfamoyl or N,N-diethylsulfamoyl.

A phenylamino radical X is preferably a phenylamino radical which is unsubstituted or substituted by, for example, methyl, methoxy, chlorine, sulfamoyl and/or sulfo.

A substituted or unsubstituted N-$C_1$–$C_4$alkyl-N-phenylamino radical X is preferably an unsubstituted N-$C_1$–$C_4$alkyl-N-phenylamino radical and especially preferably the N-methyl- or N-ethyl-N-phenylamino radical.

Preferred $C_1$–$C_4$alkoxy radicals X are methoxy, ethoxy or n- or iso-propoxy.

$C_1$–$C_4$Alkylthio X is preferably methylthio or ethylthio.

An alkylamino radical X is preferably N-mono- or N,N-di-$C_1$–$C_2$alkylamino which is unsubstituted or substituted by hydroxy, carboxy or sulfo.

Examples of substituents X which can be used are therefore hydroxy, methoxy, ethoxy, n- or iso-propoxy, chlorine, methylthio, ethylthio, amino, methylamino, ethylamino, carboxymethylamino, β-hydroxyethylamino, N,N-di-β-hydroxyethylamino, β-sulfoethylamino, phenylamino, o-, m- or p-methoxyphenylamino, o-, m- or p-methylphenylamino, o-, m- or p-sulfophenylamino, o-, m- or p-chlorophenylamino, 3,4-dichlorophenylamino, N-ethyl-N-phenylamino, N-methyl-N-phenylamino or morpholino.

In a preferred embodiment of the present invention, compounds of the above-indicated formula (1), in which X is hydroxy, chlorine, amino, phenylamino, o-, m- or p-methoxyphenylamino, o-, m- or p-methylphenylamino, o-, m- or p-sulfophenylamino, o-, m- or p-chlorophenylamino or 3,4-dichlorophenylamino, are used.

Especially preferably X is chlorine, phenylamino or o-, m- or p-methoxyphenylamino.

Of particular interest is the use of compounds of the formula

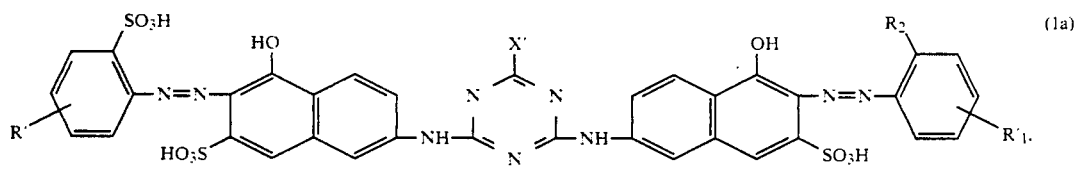

in which R' and R'₁ independently of one another are each hydrogen, methyl, ethyl, methoxy, ethoxy, acetylamino, hydroxyacetylamino, propionylamino or benzoylamino, R₂ is hydrogen or sulfo and X' is hydroxy, chlorine, amino, phenylamino, o-, m- or p-methoxyphenylamino, o-, m- or p-methylphenylamino, o-, m- or p-sulfophenylamino, o-, m- or p-chlorophenylamino or 3,4-dichlorophenylamino.

Of very special interest is the use of compounds of the formula

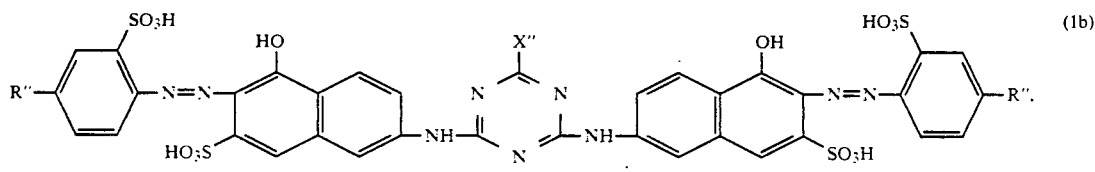

in which R" is methyl, methoxy, ethoxy, acetylamino, propionylamino or benzoylamino and X" is chlorine, phenylamino or o-, m- or p-methoxyphenylamino.

Some of the compounds of the formula (1) are known and can be obtained in a manner known per se, for example by reacting a compound of the formula

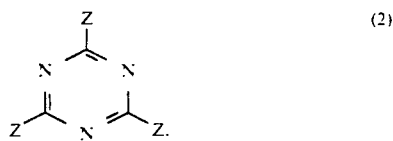

in which Z is halogen and preferably chlorine, successively in any order with a compound of the formula

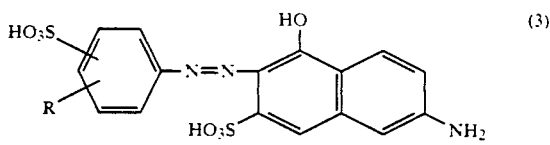

and a compound of the formula

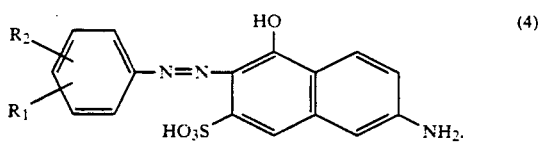

in which R, R₁ and R₂ each are as defined above, and, if desired, replacing the remaining halogen atom Z by one of the radicals X mentioned above. If the compounds of the formula (3) and (4) are identical aminoazo compounds, advantageously about 2 equivalents of this compound are reacted with 1 equivalent of the triazine compound of the formula (2).

The compounds of the formula (1), in which X is a substituted or unsubstituted phenylamino radical, are novel and represent a further subject of the invention.

The compounds according to the invention, of the formula (1), are suitable for dyeing furs and especially leather, all types of leather, for example chrome leather, retanned leather or suede leather from goats, sheep, cattle and pigs being suitable.

The dyeing is preferably carried out by the exhaustion process, for example at a liquor ratio from 1:1.5 to 1:20, preferably 1:2 to 1:10, and at temperatures from 20° to 100° C., preferably 40° to 60° C. If desired or necessary, the leather can be subjected to a pretreatment, for example to neutralisation and/or milling.

The dyeing time varies depending on the type of the leather and the desired depth of colour, but is in general between 45 and 180 minutes. After dyeing, the leather is rinsed and finished as usual.

This gives brilliant red dyeings having good general fastness properties, such as fastness to diffusion, light, acid and alkali. The dyeings of the compounds of the formula (1) show good absorption capacity, good acid and alkali stability and good electrolyte resistance. The good build-up capacity on the most diverse leather types such as pure chrome leather and especially retanned leather and also the constancy of the shade on different leather types merit particular mention.

The examples which follow serve to explain the invention, without restricting it thereto. Parts are parts by weight and percentages are per cent by weight.

EXAMPLE 1

100 parts of garment suede leather are milled for 2 hours at 50° C. in a solution of 1000 parts of water and 2 parts of 24% ammonia and then dyed at 60° C. in a solution of 1000 parts of water, 2 parts of 24% ammonia and 3 parts of the dye of the formula

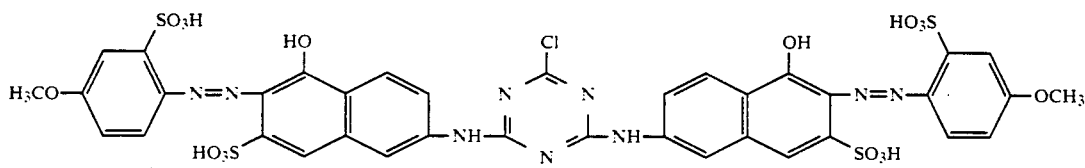

for 1 hours. A solution of 40 parts of water and 4 parts of 85% formic acid is then added and dyeing is continued for a further 30 minutes. The leathers are then well rinsed and, if desired, also treated with 2 parts of a dicyandiamide/formaldehyde condensation product for 30 minutes at 50° C. This gives a brilliant red dyeing having good fastness properties.

EXAMPLE 2

100 parts of chrome side leather are milled for 45 minutes at 30° C. in a liquor comprising 200 parts of water, 1 part of sodium bicarbonate and 1 part of sodium formate and then washed twice with 300 parts of water at the same temperature. The leather neutralized in this way is treated for 60 minutes at 30° C. in a liquor comprising 300 parts of water and 6% of a synthetic retanning agent (formaldehyde condensation product of phenolic sulfonic acids). The neutralized and retanned leather is then dyed at 50° C. in a fresh liquor comprising 300 parts of water and 2 parts of the dye of the formula

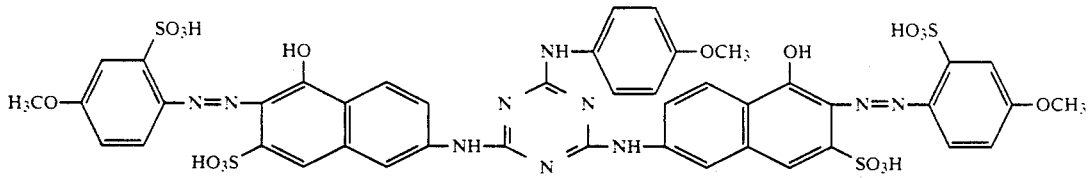

After a dyeing time of 30 minutes, 3% of a synthetic fat-liquoring agent and, after a further 30 minutes, 1 part of 85% formic acid are added. After acidification, the treatment is continued for 20 minutes at 50° C., and the leather is then rinsed in cold water and finished as usual.

This gives a brilliant red dyeing having good general fastness properties.

EXAMPLES 3 TO 30

Proceeding as described in Examples 1 or 2 and using equivalent quantities of the dyes, listed in Table 1, of the general formula

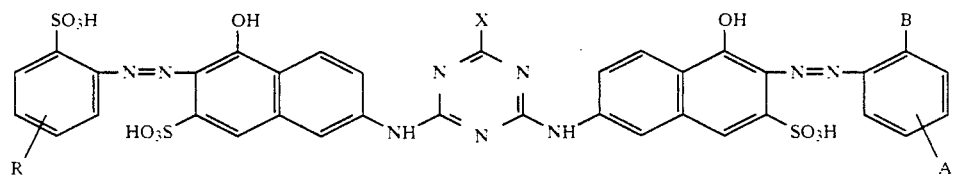

brilliant yellowish-tinged red dyeings having good general fastness properties are obtained in each case.

TABLE 1

| Example No. | R | A | B | X |
|---|---|---|---|---|
| 3 | 4-OCH$_3$ | 4-OCH$_3$ | SO$_3$H | F |
| 4 | 4-OCH$_3$ | 4-OCH$_3$ | SO$_3$H | OH |
| 5 | 4-OCH$_3$ | 4-OCH$_3$ | SO$_3$H | NH$_2$ |
| 6 | 4-OCH$_3$ | 4-OCH$_3$ | SO$_3$H | NH—C$_6$H$_4$(o-OCH$_3$) |
| 7 | 4-OCH$_3$ | 4-OCH$_3$ | SO$_3$H | NH—C$_6$H$_4$(m-OCH$_3$) |
| 8 | 4-OCH$_3$ | 4-OCH$_3$ | SO$_3$H | NH—C$_6$H$_5$ |
| 9 | 4-OCH$_3$ | 4-OCH$_3$ | SO$_3$H | NH—C$_6$H$_4$(p-Cl) |

TABLE 1-continued

| Example No. | R | A | B | X |
|---|---|---|---|---|
| 10 | 4-OCH₃ | 4-OCH₃ | SO₃H | -NH-C₆H₃(3,4-Cl₂) |
| 11 | 4-OCH₃ | 4-OCH₃ | SO₃H | -NH-C₆H₄-4-CH₃ |
| 12 | 4-OCH₃ | 4-OCH₃ | SO₃H | -NH-C₆H₄-2-CH₃ |
| 13 | 4-NHCOCH₃ | 4-NHCOCH₃ | SO₃H | Cl |
| 14 | 4-NHCOCH₃ | 4-NHCOCH₃ | SO₃H | -NH-C₆H₅ |
| 15 | 4-NHCOCH₃ | 4-NHCOCH₃ | SO₃H | -NH-C₆H₄-4-OCH₃ |
| 16 | 4-NHCOCH₃ | 4-NHCOCH₃ | SO₃H | -NH-C₆H₄-4-SO₃H |
| 17 | 4-NHCOC₂H₅ | 4-NHCOC₂H₅ | SO₃H | Cl |
| 18 | NH-CO-C₆H₅ | NH-CO-C₆H₅ | SO₃H | Cl |
| 19 | NH-CO-C₆H₅ | NH-CO-C₆H₅ | SO₃H | -NH-C₆H₄-4-SO₃H |
| 20 | 4-CH₃ | 4-CH₃ | SO₃H | Cl |
| 21 | 4-CH₃ | 4-CH₃ | SO₃H | -NH-C₆H₄-4-SO₃H |
| 22 | 4-CH₃ | 4-CH₃ | SO₃H | -NH-C₆H₅ |
| 23 | 4-OC₂H₅ | 4-OC₂H₅ | SO₃H | -NH-C₆H₅ |
| 24 | 4-OC₂H₅ | 4-OC₂H₅ | SO₃H | Cl |
| 25 | 4-OCH₃ | H | OCH₃ | Cl |

TABLE 1-continued

| Example No. | R | A | B | X |
|---|---|---|---|---|
| 26 | 4-OCH₃ | H | OCH₃ | 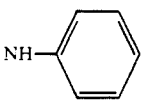 |
| 27 | 4-OCH₃ | H | SO₃H | 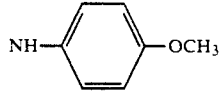 |
| 28 | 4-OCH₃ | 4-CH₃ | SO₃H | Cl |
| 29 | 4-CH₃ | H | SO₃H | Cl |
| 30 | 4-OCH₃ | H | SO₃H | Cl |

What is claimed is:

1. The process for dyeing of leather which comprises the use of a compound of the formula

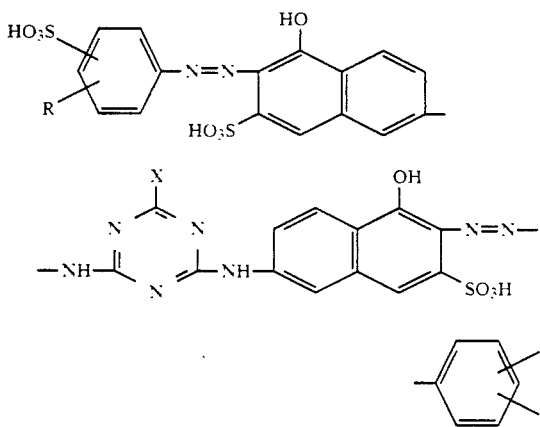

in which R and R₁ independently of one another are hydrogen, $C_1$-$C_4$alkyl, $C_1$-$C_4$alkoxy, unsubstituted or substituted $C_2$-$C_4$alkanoylamino or substituted or unsubstituted benzoylamino, R₂ is hydrogen or sulfo and X is hydroxy, $C_1$-$C_4$alkoxy, $C_1$-$C_4$alkylthio, amino, cyclohexylamino, morpholino, 3-carboxy- or 3-carbamoyl-pyridin-1-yl, halogen or substituted or unsubstituted phenylamino or N-$C_1$-$C_4$alkyl-N-phenylamino.

2. The process according to claim 1, wherein R and R₁ independently of one another are each hydrogen, $C_1$-$C_4$alkoxy, methyl, ethyl, unsubstituted or hydroxy-substituted acetylamino, propionylamino or n- or iso-butyrylamino or benzoylamino which is unsubstituted or substituted by methyl, methoxy, chlorine, sulfamoyl and/or sulfo.

3. The process according to claim 1, wherein R and R₁ independently of one another are each hydrogen, methyl, ethyl, methoxy, ethoxy, acetylamino, hydroxyacetylamino, propionylamino or benzoylamino.

4. The process according to claim 1, wherein R and R₁ are each methyl, methoxy, ethoxy, acetylamino, propionylamino or benzoylamino.

5. The process according to claim 1, wherein R and R₁ are each acetylamino or methoxy.

6. The process according to claim 1, wherein R and R₁ are each methoxy.

7. The process according to claim 1, wherein X is fluorine, chlorine, bromine, phenylamino or N-$C_1$-$C_4$alkyl-N-phenylamino which is in each case unsubstituted or substituted in the phenyl moiety by $C_1$-$C_4$alkyl, $C_1$-$C_4$alkoxy, carboxy, sulfo, sulfamoyl, N-mono- or N,N-di-$C_1$-$C_4$alkylsulfamoyl and/or halogen, or is hydroxy, methoxy, ethoxy, n- or iso-propoxy, methylthio, ethylthio, amino, or morpholino.

8. The process according to claim 1, wherein X is hydroxy, methoxy, ethoxy, n- or iso-propoxy, chlorine, methylthio, ethylthio, amino, phenylamino, o-, m- or p-methoxyphenylamino, o-, m- or p-methylphenylamino, o-, m- or p-sulfophenylamino, o-, m- or p-chlorophenylamino, 3,4-dichlorophenylamino, N-ethyl-N-phenylamino, N-methyl-N-phenylamino or morpholino.

9. The process according to claim 1, wherein X is hydroxy, chlorine, amino, phenylamino, o-, m- or p-methoxyphenylamino, o-, m- or p-methylphenylamino, o-, m- or p-sulfophenylamino, o-, m- or p-chlorophenylamino or 3,4-dichlorophenylamino.

10. The process according to claim 1, wherein X is chlorine, phenylamino or o-, m- or p-methoxyphenylamino.

11. The process according to claim 1, wherein R₂ is sulfo.

12. The process according to claim 1 which comprises the use of a compound of the formula

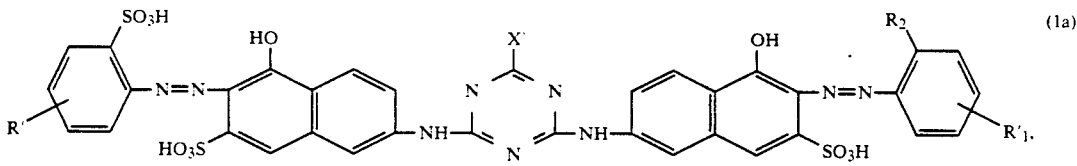

in which R' and R'₁ independently of one another are each hydrogen, methyl, ethyl, methoxy, ethoxy, acetylamino, hydroxyacetylamino, propionylamino or benzoylamino, R₂ is hydrogen or sulfo and X' is hydroxy, chlorine, amino, phenylamino, o-, m- or p-methoxyphenylamino, o-, m- or p-methylphenylamino, o-, m- or p-sulfophenylamino, o-, m- or p-chlorophenylamino or 3,4-dichlorophenylamino.

13. The process according to claim 1 which comprises the use of a compound of the formula

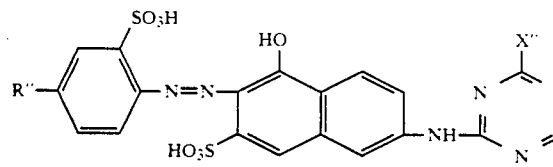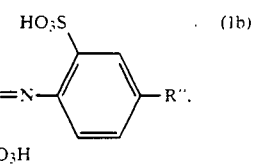

in which R" is methyl, methoxy, ethoxy, acetylamino, propionylamino or benzoylamino and X" is chlorine, phenylamino or o-, m- or p-methoxyphenylamino.

14. The process according to claim 13, wherein R" is methoxy.

15. A compound of the formula (1) according to claim 1, in which X is unsubstituted or substituted phenylamino.

16. A compound of the formula (1b) according to claim 13, in which X" is phenylamino or o-, m- or p-methoxyphenylamino.

* * * * *